(12) United States Patent
Hoerpel et al.

(10) Patent No.: US 8,968,895 B2
(45) Date of Patent: Mar. 3, 2015

(54) LITHIUM CELLS AND BATTERIES WITH IMPROVED STABILITY AND SAFETY, METHOD FOR THE PRODUCTION THEREOF, AND APPLICATION IN MOBILE AND STATIONARY ELECTRICAL ENERGY ACCUMULATORS

(75) Inventors: Gerhard Hoerpel, Nottuln (DE); Martin Schuster, Kamenz (DE); Dirk Hoppe, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/810,670

(22) PCT Filed: Jul. 12, 2011

(86) PCT No.: PCT/EP2011/061877
§ 371 (c)(1),
(2), (4) Date: Jan. 17, 2013

(87) PCT Pub. No.: WO2012/010468
PCT Pub. Date: Jan. 26, 2012

(65) Prior Publication Data
US 2013/0122330 A1 May 16, 2013

(30) Foreign Application Priority Data
Jul. 23, 2010 (DE) .................. 10 2010 038 308

(51) Int. Cl.
*H01M 14/00* (2006.01)
*H01M 2/02* (2006.01)
(Continued)

(52) U.S. Cl.
CPC ............ *H01M 2/0257* (2013.01); *H01M 2/021* (2013.01); *H01M 2/0262* (2013.01);
(Continued)

(58) Field of Classification Search
CPC ..... H01M 2/021; H01M 2/0262; H01M 2/08; H01M 2/1072; H01M 2/1094; H01M 2/0257; H01M 6/42; H01M 10/425; H01M 10/5004; H01M 10/052; Y02E 60/12; Y02T 10/7011
USPC ............................................................ 429/7
See application file for complete search history.

(56) References Cited

U.S. PATENT DOCUMENTS 6,207,289 B1 3/2001 Hoffmann et al.
2004/0253512 A1* 12/2004 Watanabe et al. ............. 429/210
(Continued)

FOREIGN PATENT DOCUMENTS

DE   10 2007 010 751   8/2008
DE   10 2007 063 179   6/2009
(Continued)

OTHER PUBLICATIONS

International Search Report Issued Jan. 2, 2012 in PCT/EP11/61877 Filed Jul. 12, 2011.
(Continued)

*Primary Examiner* — Gary Harris
(74) *Attorney, Agent, or Firm* — Oblon, Spivak, McClelland, Maier & Neustadt, L.L.P.

(57) ABSTRACT

The invention relates to a battery comprising an electrode separator arrangement filled with an electrolyte, characterized in that the electrode separator arrangement is at least partially covered with a casting compound (FIG. 6a). The invention also relates to a method for producing such a battery.

17 Claims, 6 Drawing Sheets

(51) Int. Cl.
  *H01M 2/08* (2006.01)
  *H01M 2/10* (2006.01)
  *H01M 6/42* (2006.01)
  *H01M 10/42* (2006.01)
  *H01M 10/052* (2010.01)
  *H01M 10/613* (2014.01)

(52) U.S. Cl.
  CPC ............ *H01M 2/08* (2013.01); *H01M 2/1072* (2013.01); *H01M 2/1094* (2013.01); *H01M 6/42* (2013.01); *H01M 10/425* (2013.01); *H01M 10/052* (2013.01); *H01M 10/5004* (2013.01); *Y02T 10/7011* (2013.01)
  USPC ........................................................... 429/7

(56) References Cited

U.S. PATENT DOCUMENTS

| | | |
|---|---|---|
| 2008/0097025 A1 | 4/2008 | Spyrou et al. |
| 2008/0269415 A1 | 10/2008 | Spyrou et al. |
| 2008/0274394 A1 | 11/2008 | Schormann et al. |
| 2010/0168329 A1 | 7/2010 | Hoppe et al. |
| 2010/0222540 A1 | 9/2010 | Raukamp et al. |
| 2012/0208081 A1 | 8/2012 | Bartkowiak et al. |
| 2012/0313031 A1 | 12/2012 | Hoppe et al. |
| 2013/0034738 A1 | 2/2013 | Pilgram et al. |

FOREIGN PATENT DOCUMENTS

| | | |
|---|---|---|
| EP | 1 487 034 | 12/2004 |
| JP | 2005-005163 | 1/2005 |
| JP | 2008-166169 | 7/2008 |
| WO | 2006 040226 | 4/2006 |
| WO | 2007 028790 | 3/2007 |
| WO | WO 2008/081298 A1 | 7/2008 |
| WO | 2011 072903 | 6/2011 |
| WO | 2011 144644 | 11/2011 |

OTHER PUBLICATIONS

U.S. Appl. No. 13/642,762, filed Oct. 22, 2012, Albrecht, et al.
U.S. Appl. No. 13/703,914, filed Dec. 13, 2012, Pilgram, et al.
Office Action mailed Nov. 4, 2014, in counterpart Japanese Patent Application No. 2013-521049, filed Jul. 23, 2012, 2 pages.

* cited by examiner

LITHIUM CELLS AND BATTERIES WITH IMPROVED STABILITY AND SAFETY, METHOD FOR THE PRODUCTION THEREOF, AND APPLICATION IN MOBILE AND STATIONARY ELECTRICAL ENERGY ACCUMULATORS

The present invention relates to lithium batteries which have been embedded into a polymeric potting compound and have improved mechanical stability and tolerance.

In the context of the present invention, lithium primary and secondary batteries are collectively abbreviated to "LIB", no matter whether they are in a cylindrical or prismatic cell design and/or in a wound or stacked arrangement.

Figure 1:
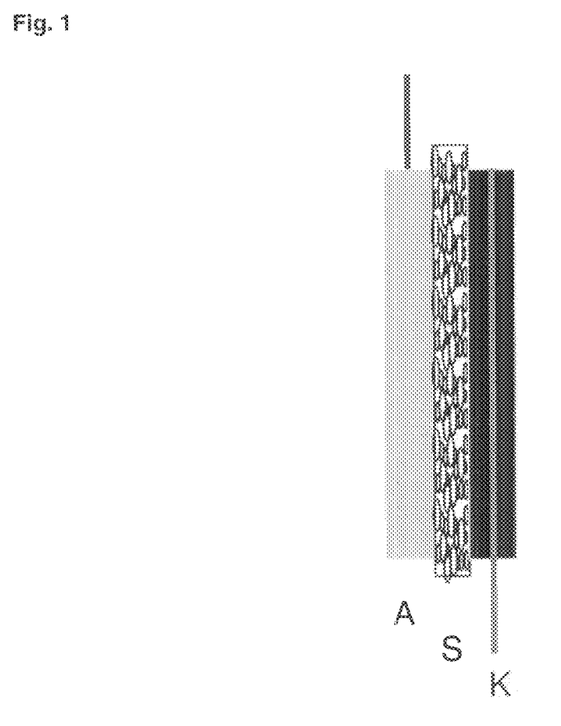
FIG. 1 shows an example of an electrode-separator arrangement (ESA).

An "electrode-separator arrangement", abbreviated to "ESA", is understood here and hereinafter to mean an arrangement composed of a cathode, a separator and an anode, shown schematically in FIG. 1. The reference signs mean: K—cathode, A—anode, S—separator. If the separator has been filled with electrolyte, the electrochemical processes known to those skilled in the art can proceed, the mechanical contact of the cathode with the anode being prevented by the separator. Such an arrangement is equivalent to a unit cell. In the context of the invention, it is unimportant whether the separator is based on a substrate or whether the separator has been applied directly to at least one electrode and is bonded thereto in a fixed manner.

Figure 2:
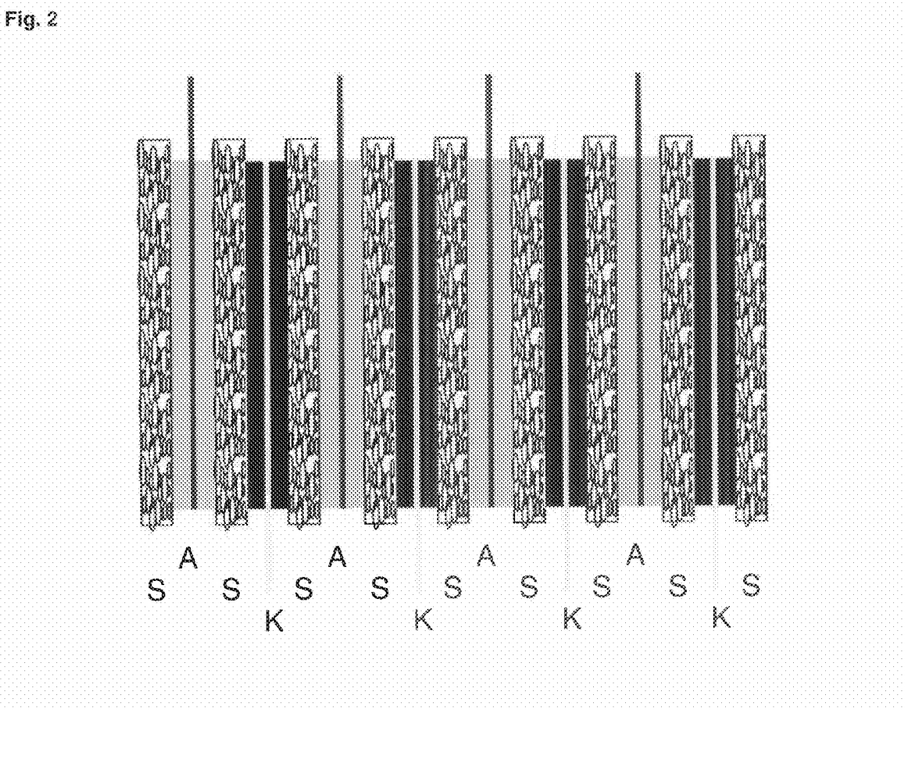
FIG. 2 shows a schematic drawing of a stack of 7 ESAs in which each ESA is provided with a separator on the outer sides thereof.

A "stack" is understood to mean a stacked arrangement of at least two ESAs which are electrically connected to one another, each on the same pole. FIG. 2 shows, in schematic form, a stack of 7 ESAs each provided with a separator on the outer sides thereof.

LIBs are currently finding wide use in consumer electronics, for example in cellphones and notebooks, in appliances for everyday use, and in electrically operated tools.

In accordance with these uses, the requirements on such energy stores are numerous and strict. They have for some time proceeded from the basic idea of insulating, referred to as "encasing", batteries appropriately for their end use such that unwanted interactions with humans and the environment are prevented or minimized.

Encased Batteries
must have sufficient stability, stiffness and nonflammability,
should be dimensionally stable under mechanical and thermal stress, which is crucial for exterior use, for example, in cellphones and computers, which are becoming ever more compact,
must function reliably under varying ambient conditions, for example under varying air pressure during air travel,
must have adequate electrical insulation values according to requirements long established in the field,
must not develop any leaks, since, for example, leakage of the battery can sometimes destroy highly sensitive electronics,
may constitute an explosion or fire risk at most to a permissible degree, if at all, for example in explosion-endangered areas of the chemical industry.

Quantitative properties obvious to the person skilled in the art, which are verified in standardized tests, are the electrical safety of the batteries in the event of a short circuit, polarity reversal, and in the case of secondary batteries also behavior in the event of overcharging, exhaustive discharge, excess temperature, according to the envisaged use.

Batteries, particularly high-power batteries, even if used improperly, should to a certain degree also result only in an at least controllable risk, if any.

Tests which provide statements about mechanical safety subject batteries to defined squeezing, vibration, impact, drop and shock stresses, altered ambient pressures and air humidity. Thermal and electrical qualities are also tested, for example capacity and charging and discharging characteristics at elevated temperature, and also intrinsic evolution of heat in the course of cycling.

In order to optimize the properties just mentioned, two routes are taken for the encasing of cells. Firstly, metal casings are used, into which usually wound ESAs are inserted and subsequently welded. Secondly, as of recently, wound or stacked ESAs have been packaged into watertight aluminum composite foils and welded to form a "coffee bag" or "pouch cell design".

WO 2008/106946 A2 describes an energy storage cell in a flexible shell secured to a heat conduction plate. The latter is gas-tight and consists partly of an aluminum composite foil. Imperviousness to penetration of solid, liquid or gaseous components is achieved according to the prior art by the packaging, including the adhesive bond or weld thereof.

WO 2008/098555 A1 compensates for the mechanical weaknesses resulting from crimped, adhesive or weld seams, by securing the energy storage cells in a housing and clamping them to at least one edging between parts of a housing module. The housing of the arrangement thus obtained can be subdivided by intermediate housing layers which may consist of a flexible potting material.

However, all these prior art designs meet the requirements of modern batteries only in part. For instance, pouch cells have weaknesses particularly in mechanical durability. Rigid housings, on the other hand, are more mechanically stable but, in the event of electrical misuse, are much more prone to a pressure buildup in the interior of the housing. Such a pressure buildup can be caused, for example, by electrolytic decomposition of parts of the ESA due to improper use or aging. It is of course known that rigid housings can give way to rising internal pressure only to a limited degree. If the pressure rises above a critical value, an excess pressure valve must ensure pressure release.

The use of casting resins in electrical systems is likewise known, for example the use of monomer-free unsaturated polyester resins. The potting of electrical bodies such as capacitors by means of electrical potting resins has also been described many times.

WO 2008/104356 A1 presents a battery in a battery housing. The cell composite of this battery is surrounded by a potting compound composed of foam, polyurethane, epoxy resin and/or silicone, which reaches from the cell composite to the inside of the housing. The potting compound serves to fix the cell composite in the housing, to electrically insulate it and to dissipate the heat which arises in the course of charging and discharging. It is possible to dispense with the outer shell surrounding the cell composite, but not with the battery housing, with which the potting compound establishes a mechanically fixed contact and which serves as a mold in the production of such a battery. A battery more suitable for everyday use is obtained, which has a greater stability against external stresses, for example against shocks or vibrations. The consequence of extreme stress, for example an explosion as a result of overcharging, is absorbed firstly by the battery housing. Secondly, a portion of the explosion energy released is discharged to the environment without reduction, since the cell composite is obviously not surrounded by any material whatsoever at least on the side with the electrical contacts.

There is thus still a need for reliable LIBs for use in very demanding applications, for example in traction systems, including in hybrid and fully electric automobiles. As well as energy and power density, particularly service life and reliability are also required under changing thermal and mechanical influences, and these, in the batteries to be designed with very high power density in these applications, will be of crucial importance for the market success of this technology. In consortia of American and European automakers, requirements for LIBs have been defined, and these make reliability and long life verifiable for these batteries. Only in this way will this technology capture the field of application of large mobile and stationary batteries.

It was thus an object of the present invention to provide a battery which has improved reliability and overcomes the disadvantages of conventional pouches or housings.

This object is achieved by a battery having the characterizing features of the main claim.

The present invention provides a battery having an electrolyte-filled electrode-separator arrangement, which is characterized in that the electrode-separator arrangement is at least partly encased with potting compound.

The inventive battery has the advantage of much improved mechanical stability and malfunction tolerance, since seams and crimping or clamping sites or edgings required in the prior art in housing components are dispensed with. Compared to batteries with conventionally packed arrangements welded or clamped in foils or pouches, the inventive battery has longer service life due to the more durable seal and is better protected both against the escape of the electrolyte and against environmental influences, for example the penetration of solid, liquid or gaseous substances from the outside. It thus also has higher failsafeness and operating reliability.

The inventive battery is impervious to organic and inorganic gases and liquids, and is also resistant to chemicals and impact, elastic under cold conditions, stable over the long term, and thermally, dimensionally and mechanically stable. This facilitates use in a wide variety of different environments.

The coefficient of expansion of the potting compound of the inventive battery corresponds to the temperature variations which occur in the use of the battery.

Additionally provided is a process for producing the inventive battery, comprising the steps of
(a) providing at least one electrode-separator arrangement and the reactant(s) of at least one potting compound,
(b) securing the electrode-separator arrangement or arrangements,
(c) encasing with the reactant(s) of the potting compound,
(d) curing and/or polymerizing, to obtain the battery.

The advantage of the process according to the invention is that the potting compound can be adjusted to a wide variety of requirements in step (a). According to the selection of the reactants of the potting compound, it is possible to influence or adjust the chemical resistance, impact resistance, cold elasticity, tear propagation resistance, thermal stability, dimensional stability, mechanical stability, dielectric properties, dielectric strength of the stressed battery, measurement accuracy in relation to the installation conditions of the battery as a result of low shrinkage in the course of conversion of the reactants to the potting compound, equivalent to the hardening and/or polymerization in step (d).

As a result, the potting compound protects both the electrode-separator arrangement and the output conductor region from corrosion. The advantage is manifested even in the case of conventionally packaged batteries, since the usual composite films are stressed to a lesser degree by environmental influences.

The present invention likewise provides for the use of the inventive battery in stationary or mobile use, preferably in a hybrid system on board motor vehicles, motorcycles, trucks, ships, machinery, in emergency power supply, in the securing of wind, water and/or solar power generators.

The inventive battery and the process for production thereof are illustrated in detail hereinafter.

For the inventive battery, ESAs of different designs can be selected. It can be stacked from at least two unit cells arranged preferably in parallel or in series. The electrode-separator arrangement may be a stack, several cells or cell assemblies, or a combination of these designs. The battery may have rechargeable (secondary) or non-rechargeable (primary) electrolyte-filled ESAs.

The inventive battery may additionally comprise one or more ESAs with or without packaging by a pouch or foil.

The separator of the inventive battery may be a prior art separator. This separator may preferably be ceramic, more preferably ceramic and/or applied directly to at least one electrode, and may most preferably be the separator disclosed in documents DE 19741498, DE 19811708, DE 19812035, DE 19820580, DE 19824666, DE 19824666, DE 10142622, DE 10208280, DE 10208277, DE 10238941, DE 10238944, DE 10238943, DE 10238945, DE 10240032, DE 10255121, DE 10255122, DE 10347570, DE 10347569, DE 10347566, DE 10347568, DE 10347567, DE 102004018929, DE 102004018930, DE 102005029124, DE 102005042215, DE 102007005156.

The material of the electrodes of the inventive battery may be selected from the prior art. The cathode-side active electrode material may preferably be selected from lithium metal oxides, lithium metal phosphates, more preferably lithium nickel manganese cobalt oxides, LFPs, NCAs or LMOs known to the prior art, or mixtures of these materials.

The anode-side active electrode material may preferably be selected from natural or synthetic graphites, preferably hard carbon, soft carbon, coated graphites, or else selected from lithium titanates, lithium metal or mixtures, most preferably synthetic graphites with or without coatings.

Particularly advantageously, the inventive battery may be completely encased by the potting compound, in which case only the plus and minus connections can be conducted out of the potting compound. If the unit cells are stacked, plus and minus connections can be conducted separately out of the potting compound downstream of the ESA—the circuit is then optional and is outside the potting compound, which makes the possible uses of the inventive battery particularly numerous.

The potting compound of the inventive battery may be selected from at least one casting resin selected from polyurethane and/or epoxy resin, for example a one- or two-component epoxy resin. It is possible with preference to select two or more potting compounds. This gives the inventive battery additional functionality.

It may additionally be advantageous to establish a predetermined breaking point in the potting compound of the inventive battery, which, in the case of impermissible or hazardous formation of gases within the ESA, prevents uncontrolled bursting or even an explosion and releases the medium under elevated pressure in a controlled manner.

The inventive battery can thus blow open or break open at a defined site and thus minimize the accident risk. Particularly advantageously, the potting compound can be selected such that the heat evolved in the case of overloading of the ESAs, of individual or all ESAs of the battery, is at least partly consumed by the potting compound by chemical and/or physical conversion of this potting compound. Explosion of the inventive battery is avoided as a result. Instead of exploding, as is the experience in the case of an overloaded prior art battery, the energy which must otherwise lead to an explosion is consumed partly, preferably completely, in a melting and/or local burning operation of the potting compound. Technical precautions which limit the damage caused in the course of burning, for example by means of refractory materials or fire-extinguishing systems, are much easier and less expensive to install than apparatus for protection against the effects of an explosion. A further advantage is that escaping electrolytes react with the potting compound to give substances which are chemically less hazardous to the environment and/or can be disposed of more easily.

The present invention therefore further provides a potting compound, which is characterized in that the potting compound at least partly encases at least one electrode-separator arrangement or a composite of electrode-separator arrangements.

Possible potting compounds which achieve the functionalities and associated advantages just mentioned are acrylic resins familiar to those skilled in the art, for example acrylates, methacrylates and/or styrene resins, phenol resins, and additionally polyurethane resins, more preferably aliphatic polyurethane resins, and additionally more preferably 1- or 2-component thermosets.

Particularly preferred potting compounds may be selected from Capa, T 1136, T 2960, TegoKat 218, DB 4, ByK 070, Tinuvia, or a combination of these substances. These are available from Evonik Degussa GmbH, Coatings & Additives Division, Paul-Baumann-Strasse 1, D-45774 Marl.

If there is a risk that the battery could overheat in its field of use, PMMA, for example, may be selected as the potting compound. Above a critical temperature, such a casing decomposes to gases without residue.

It may likewise be advantageous to combine, as potting compounds, composite potting compounds composed of a matrix and one or more reinforcing agents, for example with fillers, active fillers, staple fibers, mats and webs, layers, sheets and/or other foils.

The inventive potting compounds may additionally comprise electrolyte-impervious barrier layers, water or water vapor barrier layers and/or oxygen barrier layers. In steps (c) and (d) of the process according to the invention, such barrier layers can be implemented directly on the ESA. Preferably, these steps can be executed more than once in succession, more preferably when several barrier layers, most preferably with different functions, are to be implemented. Advantageously, the inventive battery has one or more such barrier layers on the ESA(s).

A further functionality consists in the introduction of pressure transducers which detect the unwanted formation of gases, equivalent to the indication of a malfunction or overloading of the inventive battery.

The output conductors of the inventive battery may project at least partly out of the casing formed by the potting compound. The output conductors are more preferably conducted out of the potting compound. This allows the inventive battery to be connected like a conventional battery, and no modification measures are required in the case of use. The electrodes of the ESAs can more preferably be conducted out of the potting compound at an edge. This enables, for example, contact connection, by inserting the inventive battery like a board into a rack or frame in the manner of a drawer into a drawer system.

It may be advantageous when the electrode-separator arrangement of the inventive battery, within the casing formed by the potting compound, has been coupled mechanically, with electrical connection and/or electromagnetically to at least one further functional element selected from heat sink, preferably heat dissipating plate, heatspreader, and/or control electronics designed in the specialist field or at least one RFID element which may serve, for example, to identify the battery.

Figure 3:
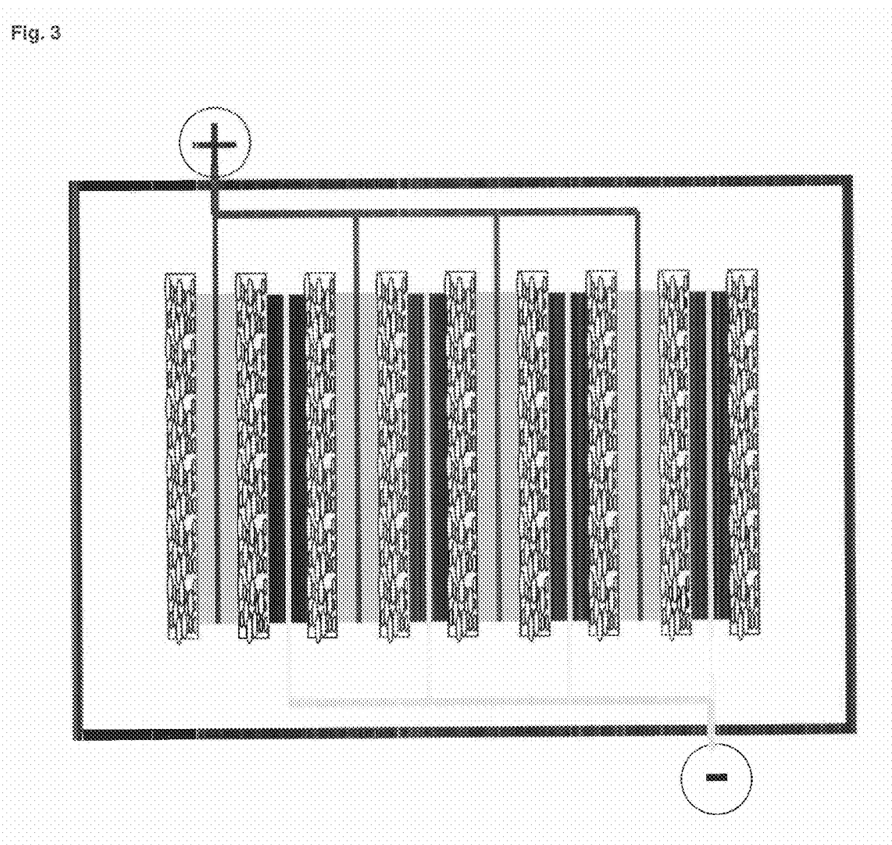
FIG. 3 shows a schematic drawing of the inventive battery with an ESA stack.

FIG. 3 shows, in schematic form, the inventive battery with an ESA stack.

Figure 4:
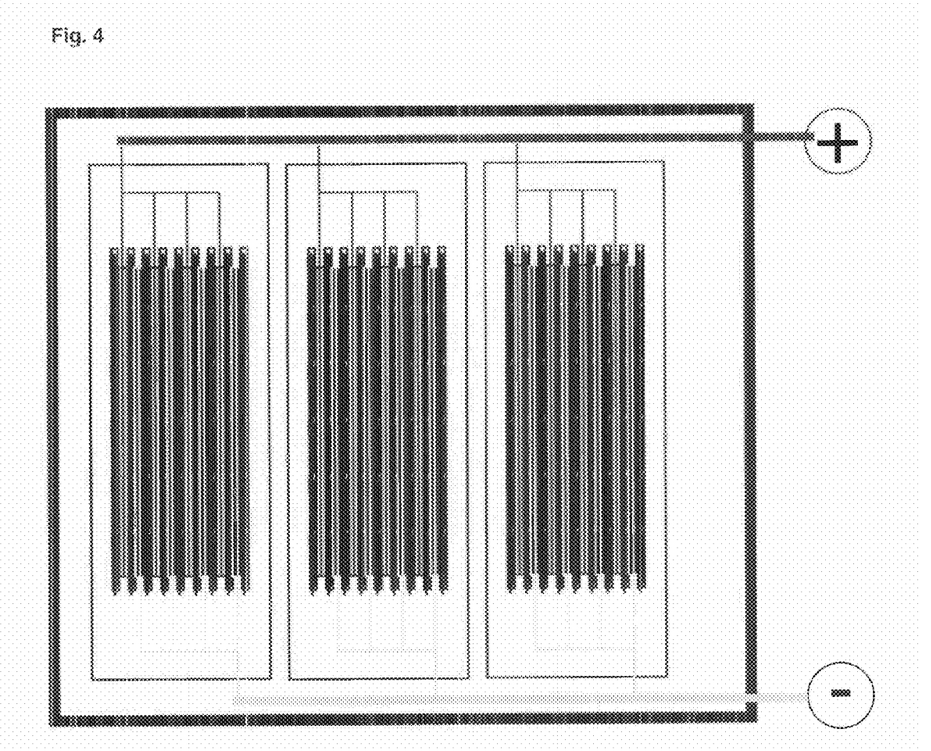
FIG. 4 shows a schematic drawing of the inventive battery with several ESA stacks connected to one another.

FIG. 4 shows, in schematic form, the inventive battery with several ESA stacks connected to one another.

The present invention also provides a process for producing the inventive battery, which comprises the steps of
  (a) providing at least one electrode-separator arrangement and the reactant(s) of at least one potting compound,
  (b) securing the electrode-separator arrangement or arrangements,
  (c) encasing with the reactant(s) of the potting compound,
  (d) curing and/or polymerizing, to obtain the battery.

In step (b) of the process according to the invention, the electrode-separator arrangement can preferably be secured to the output conductors in order at least to connect them to contacts. Additional functionalities can be secured in a manner familiar to those skilled in the art.

In step (c), preference may be given to a mold which is used only once in an inexpensive manner and/or the molding process known to those skilled in the art with or without a size is employed.

In step (d) of the process according to the invention, the time over which the potting compound cures and/or polymerizes can be selected from 0.1 to 200 min, preferably from 0.2 to 10 min, more preferably from 0.2 to 1 min. The temperature can be selected within a range from 10 to 200° C., preferably from 20 to 100° C. and more preferably from 40 to 80° C.

In the process according to the invention, step (b) may be followed and step (c) may be preceded by performance of a further step (b2) compaction of the electrode-separator arrangement or arrangements by pressurization with inert gas selected from $CO_2$, nitrogen and/or a noble gas. This pressurization achieves spatial compaction of the inventive battery and enhances the power density based on the battery volume.

The inventive battery is illustrated by way of example hereinafter.

COMPARATIVE EXAMPLE

Overloading of a Lithium Ion Battery

Figure 5A:
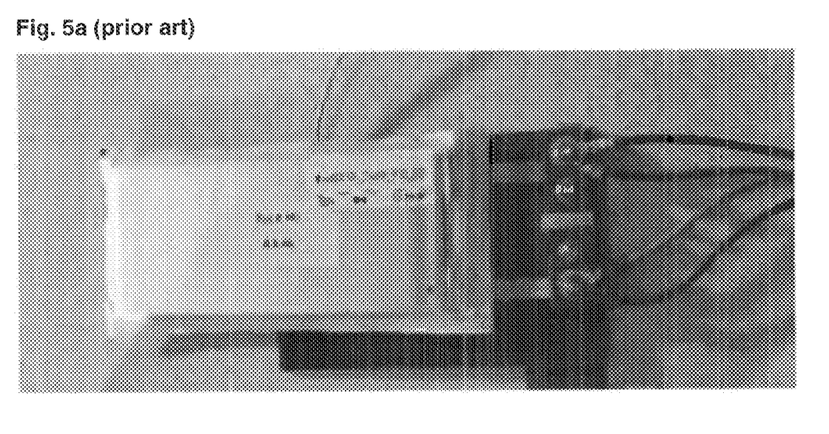
FIG. 5a shows a cell at the start of charging with connection cables of a charging unit and a pair of a temperature sensor mounted within the cell.

A lithium ion battery consisting of a stack of ESAs in an aluminized polymer film with a nominal capacity of 4.9 Ah was charged with an excessive charging current of 14.7 A. The potential was limited to 12 V. FIG. 5a shows this cell at the start of charging with the connection cables of a charging unit and the pair of a temperature sensor mounted within the cell. During the charging, cell potential, charging currents and the temperature within the cell were measured as a function of the time since commencement of charging.

Over the course of time, with approximately constant charging currents of 14.7 A, expansion of the cell was observed. After a period of about 1900 s, on attainment of a cell potential of 6.36 V, the cell had expanded like a balloon. The temperature within the cell when this period had passed was about 50° C. Later, a rapid rise in the temperature was observed.

Figure 5B:
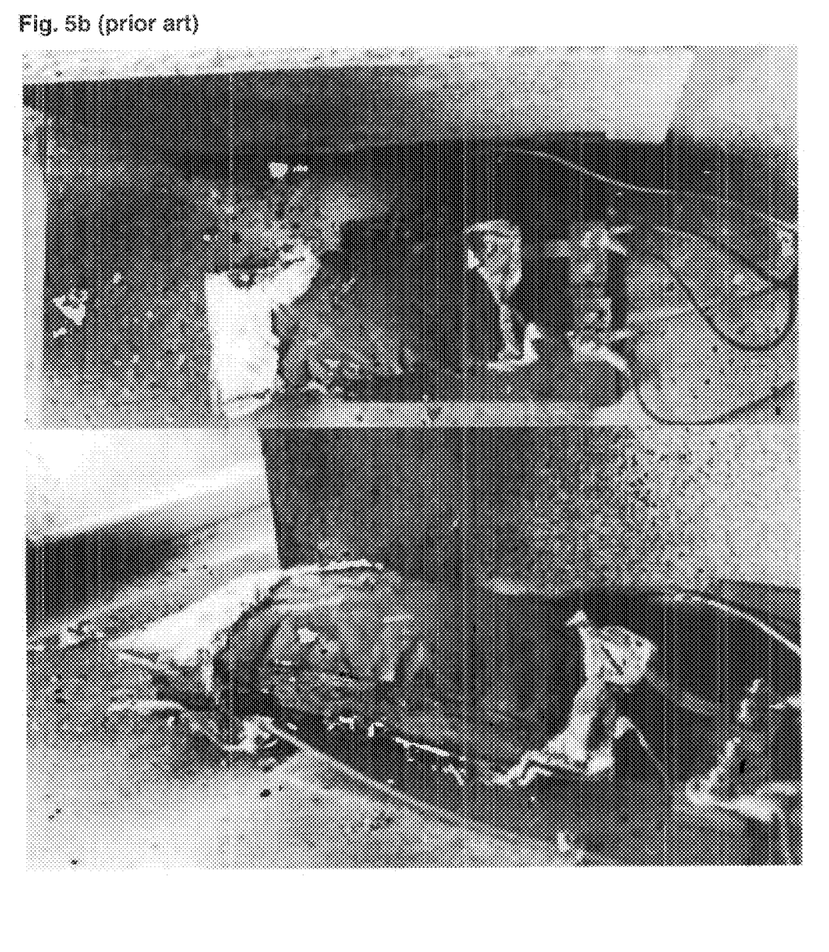
FIG. 5b shows a cell destroyed as a result of the overcharging and powdery residues scattered from the interior thereof by the explosion.

When a period of about 2100 s had passed, the temperature had risen to about 415° C. when the cell broke open with a loud bang and went up in flames. The charge current fell back to 0 A. FIG. 5b shows the cell destroyed as a result of the overcharging and powdery residues scattered from the interior thereof by the explosion.

Example 1

Overloading of an Inventive Battery

A lithium ion battery was encased as in the comparative example with a potting compound which was composed of 35.2% by weight of Capa 3050, 28.2% by weight of T 1136, 38.3% by weight of T 2960, 0.01% by weight of TegoKat 218, 0.01% by weight of DB 4, 0.1% by weight of ByK 070 and 0.51% by weight of Tinuvia.

Figure 6A:
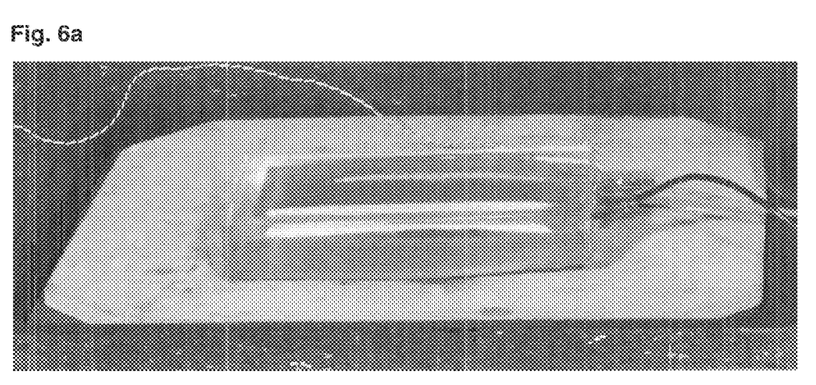
FIG. 6a shows a battery on commencement of the charging with connection cables of a charging unit and a pair of a temperature sensor mounted within the cell.

The inventive battery thus obtained was subsequently charged with an excessive charging current of 24.3 A. FIG. 6a shows this battery on commencement of the charging with the connection cables of the charging unit and the pair of a temperature sensor mounted within the cell. During the charging, cell potential, charging current and the temperature within the cell were measured as a function of the time since commencement of the charging.

Over the course of time, the battery was overloaded with 5 C at approximately constant charging current, and a rapid rise in the temperature was observed. But no expansion whatsoever was observed.

Figure 6B:
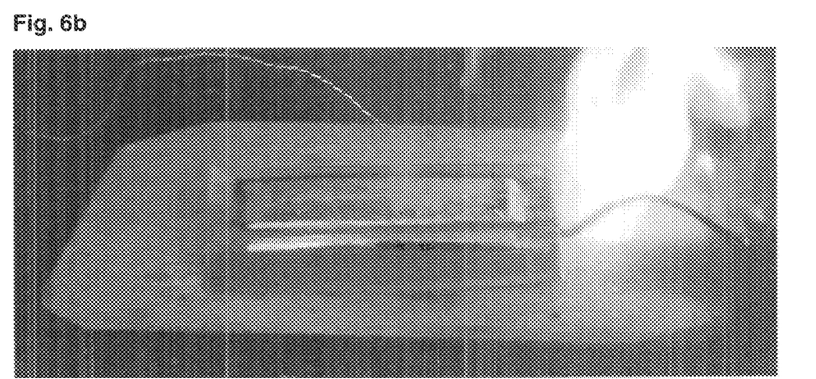
FIG. 6b shows a battery with a gradually evolving flame emerged.
Figure 6C:
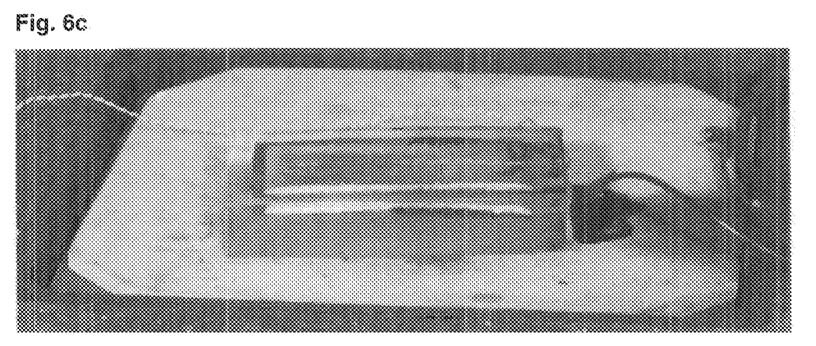
FIG. 6c shows a battery which became nonfunctional as a result of the overcharging but had neither been exploded nor burst, with a small amount of solid residue outside, which was easily removable.

When a period of about 745 s had passed, the potting compound on the side with the connection cables of the inventive battery melted gradually, and a gradually evolving flame emerged (FIG. 6b), which had been extinguished after a further 5 s (FIG. 6c). The charging current fell back to 0 A. FIG. 6c shows the battery which was nonfunctional as a result of the overcharging but had neither exploded nor burst, with a small amount of solid residue outside, which was easily removable.

The invention claimed is:

1. A battery, comprising an electrolyte and an electrode-separator arrangement at least partly encased with a potting compound, wherein the electrode-separator arrangement, which is situated within a casing formed by the potting compound, is coupled electromagnetically, or electromagnetically and mechanically with an electrical connection, to at least one further functional element selected from the group consisting of a heat sink, control electronics, and an RFID element.

2. The battery of claim 1, wherein the electrode-separator arrangement has been wound or laid, or has been stacked from at least two unit cells.

3. The battery of claim 1, wherein the potting compound comprises at least one casting resin selected from the group consisting of a polyurethane, a one-component epoxy resin, a two-component epoxy resin, and a mixture thereof.

4. The battery of claim 1, wherein output conductors project at least partly out of a casing formed by the potting compound.

5. A process for producing the battery of claim 1, the process comprising:
(a) securing at least one electrode-separator arrangement;
(b) encasing the at least one electrode-separator arrangement with at least one reactant of a potting compound; and
(c) curing, polymerizing, or both curing and polymerizing, the encased electrode-separator arrangement to obtain a battery,
wherein in (c) a curing and/or polymerizing time of the potting compound is from 0.1 to 200 min, and a temperature is from 10 to 200° C., and
wherein the electrode-separator arrangement, which is situated within a casing formed by the potting compound, is coupled electromagnetically, or electromagnetically and mechanically with an electrical connection, to at least one further functional element selected from the group consisting of a heat sink, control electronics, and an RFID element.

6. The process of claim 5, further comprising, after the securing (a):
(a2) compacting the at least one electrode-separator arrangement by pressurization with at least one inert gas selected from the group consisting of $CO_2$, nitrogen, and a noble gas.

7. An article, comprising the battery of claim 1, wherein the article is stationary or mobile.

8. A potting compound which at least partly encases at least one electrode-separator arrangement or a composite of electrode-separator arrangements.

9. The battery of claim 1, wherein the electrode-separator arrangement has been stacked from at least two unit cells arranged in parallel or in series.

10. The battery of claim 1, wherein the electrode-separator arrangement has been stacked from at least two unit cells arranged in parallel.

11. The battery of claim 1, wherein the electrode-separator arrangement has been stacked from at least two unit cells arranged in series.

12. The process of claim 5, comprising:
(c) curing and polymerizing the encased electrode-separator arrangement.

13. The article of claim 7, wherein the article is at least one selected from the group consisting of a hybrid system on a board motor vehicle, a hybrid system on a motorcycle, a hybrid system on a truck, a hybrid system on a ship, a hybrid system on a machine, an emergency power supply, a wind power generator, a water power generator and a solar power generator.

14. The process of claim 5, wherein the curing and/or polymerizing time of the potting compound is from 0.2 to 10 min.

15. The process of claim 5, wherein the curing and/or polymerizing time of the potting compound is from 0.2 to 1 min.

16. The process of claim 5, a wherein the curing and/or polymerizing temperature is from 20 to 100° C.

17. The process of claim 5, a wherein the curing and/or polymerizing temperature is from 40 to 80° C.

* * * * *